United States Patent
Cerda et al.

(10) Patent No.: US 7,486,463 B1
(45) Date of Patent: Feb. 3, 2009

(54) POWER DISTURBANCE COMPENSATION

(75) Inventors: Adrian E. Cerda, San Jose, CA (US); Amir H. Chaghajerdi, San Jose, CA (US); Pushkar Hingwe, Fremont, CA (US); Bryan S. Rowan, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/975,441

(22) Filed: Oct. 19, 2007

(51) Int. Cl.
*G11B 15/18* (2006.01)
(52) U.S. Cl. ............................ 360/69
(58) Field of Classification Search ............ 360/69, 360/55, 75, 78.06, 78.05; 369/53.13; 711/113, 711/165; 713/300; 323/260
See application file for complete search history.

(56) References Cited

U.S. PATENT DOCUMENTS

| | | | | |
|---|---|---|---|---|
| 4,438,387 A * | 3/1984 | Rohatin | ................. | 323/260 |
| 5,402,400 A * | 3/1995 | Hamada et al. | ............ | 360/78.06 |
| 6,016,234 A * | 1/2000 | Blank et al. | ............... | 360/75 |
| 6,378,037 B1 * | 4/2002 | Hall | ........................... | 711/113 |
| 6,741,417 B2 * | 5/2004 | Hsin et al. | ............... | 360/78.05 |
| 7,096,372 B2 * | 8/2006 | Sone | ........................... | 713/300 |
| 7,114,048 B2 * | 9/2006 | Iwatsu et al. | ............... | 711/165 |
| 2004/0240354 A1 * | 12/2004 | Furukawa et al. | ........ | 369/53.13 |
| 2007/0094524 A1 * | 4/2007 | Kris | ........................... | 713/300 |

* cited by examiner

*Primary Examiner*—Fred Tzeng (57) ABSTRACT

A method for compensating for a disturbance in power from a power supply, wherein the disturbance without the compensating would otherwise affect a positioning apparatus coupled to the power supply. The method comprises receiving the disturbance in power from the power supply, deriving a compensation for the disturbance in the power, and transmitting the compensation to a control system for the positioning apparatus.

25 Claims, 4 Drawing Sheets

POWER DISTURBANCE COMPENSATION

TECHNICAL FIELD

This invention relates generally to the field of servo control systems and specifically mitigating the effects of power supply disturbances on a servo control system's performance.

BACKGROUND

A servo system is a control system that controls the operation of an apparatus through a series of feedback signals to the control system. The feedback signal is typically from a sensor that determines the offset of the actual operation of the apparatus from the requested operation of the apparatus. Some examples of servo systems are: a thermostat for controlling the temperature of a room; an autopilot for controlling the flying attitude and direction of an aircraft; a cruise control for controlling the speed of an automobile; a servo system in a hard disk drive (HDD) for controlling disk RPM and magnetic transducer position.

These examples of servo systems are challenged by external disturbances that can cause them to over or under react in the control of the operation of the apparatus. Examples of external disturbances, and over and under reaction they may cause are: the air conditioning of a room may not be adjusted quickly or may cool a room too much in response to changing thermal loads; an aircraft may not respond smoothly or accurately to wind or barometric conditions to maintain an attitude or direction of the aircraft; an HDD may not react in a timely manner to demands for data from the HDD.

An HDD is one example of many possible examples of a mechanism using a servo system. One of ordinary skill in the art will appreciate that embodiments of the present invention are beneficial to a variety of mechanisms operable to a control or servo system. The HDD will be used for the sake of brevity and clarity to demonstrate the need for a well-controlled servo system and a servo system's vulnerability to problems.

Direct access storage devices (DASD) have become part of every day life, and as such, expectations and demands continually increase for greater speed for manipulating data and for holding larger amounts of data. To meet these demands for increased performance, the mechanical assembly in a DASD device, specifically the HDD, has undergone many changes.

The amount of data that can be stored on a disk is governed by many well-known physical principles. One factor in determining the amount of data that can be stored in an HDD is the ability of the magnetic transducer to write closely spaced data tracks onto the disk surface. The spacing of tracks on a disk surface is known as track pitch, and the unit of measure for expressing the density of tracks on a disk is tracks per inch or TPI. A smaller track pitch results in a higher TPI. The servo system of the HDD enables in part the magnetic transducer to be precisely positioned at a radius on the disk to write a data track, enabling adjacent data tracks to be written with a high TPI.

Once the data track is written, the HDD must be able to find the track and settle upon it in a minimal amount of time. This amount of time is typically known as seek-settle time, and when coupled with the time for the data to rotate to where it can be read and the time required for the HDD to decipher the data on the track, this total time is known as latency. An HDD user usually prefers short latency. The robustness of the servo system will determine if the magnetic transducer has settled on a desired data track or needs to make another attempt at settling on the data track. Spurious electrical and/or mechanical noise can degrade the servo system and require it to make multiple attempts at reading data. The susceptibility of a servo system to spurious noise may prevent the magnetic transducer from being positioned in a sufficiently precise manner to allow a desired TPI.

SUMMARY OF THE INVENTION

Various embodiments of the present invention are described herein. A method for compensating for a disturbance in power from a power supply, wherein the disturbance without the compensating would otherwise affect a positioning apparatus coupled to the power supply. The method comprises receiving the disturbance in power from the power supply, deriving a compensation for the disturbance in the power, and transmitting the compensation to a control system for the positioning apparatus.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of embodiments of the present invention, numerous specific details are set forth in order to provide a thorough understanding of the present invention. However, it will be recognized by one of ordinary skill in the art that embodiments of the present invention may be practiced without these specific details. In other instances, well known methods, procedures, and components have not been described in detail as not to unnecessarily obscure aspects of the present invention.

For the sake of brevity and clarity, the discussion will focus on an HDD as an example of a mechanism operable to a control and/or servo system that benefits from the embodiments of the present invention. The discussion will begin with a description and overview of a control system and a servo system. The discussion will then focus on embodiments of the present invention by which compensating for a disturbance in power from a power supply coupled with a control or servo system is implemented.

Overview

Figure 1:
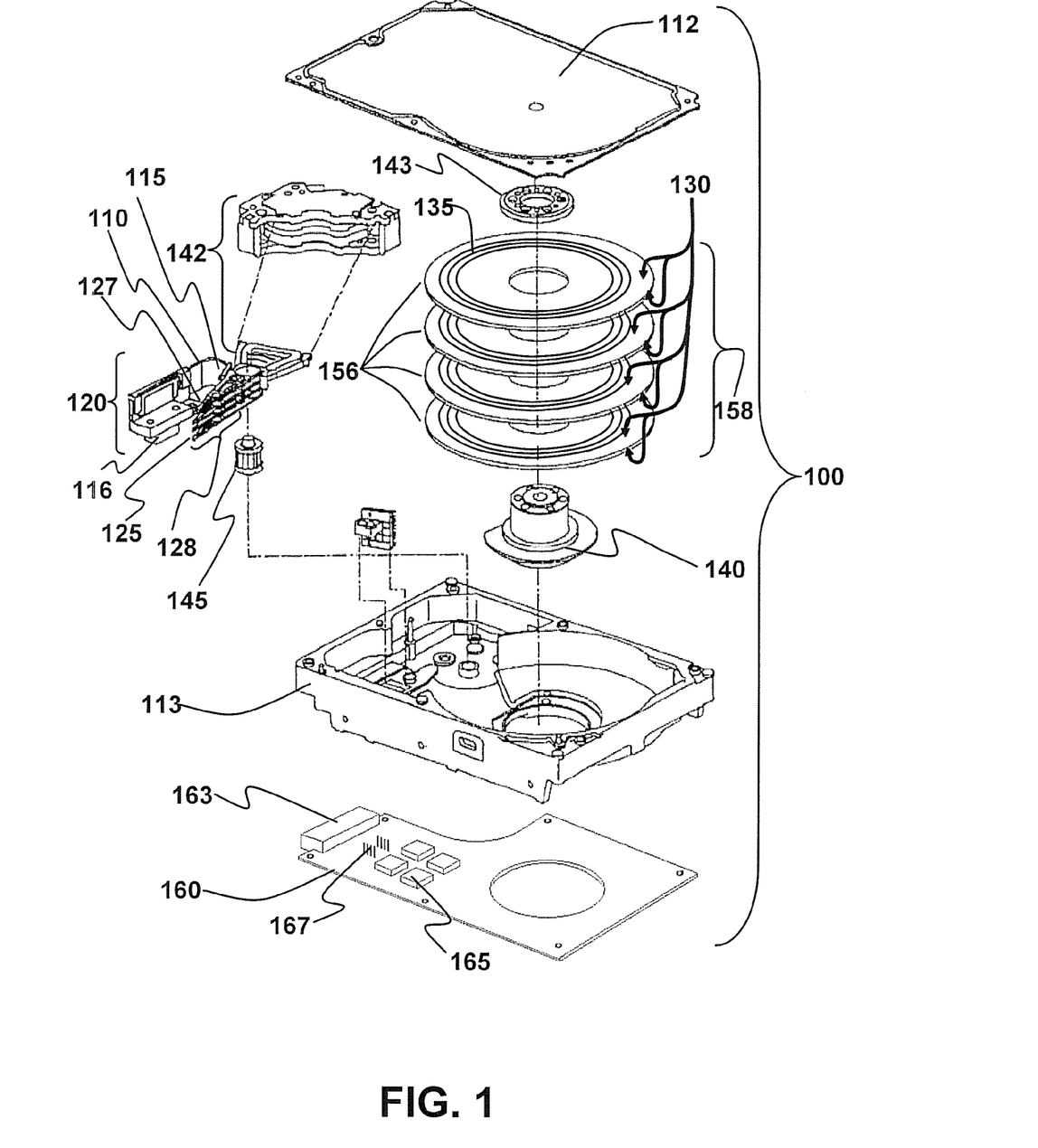
FIG. 1 is an isometric blow-apart of an HDD in accordance with one embodiment of the present invention.

With reference to FIG. 1, an isometric blow-apart of HDD 100 is presented in accordance with an embodiment of this invention. Base casting 113 provides coupling points for components and sub-assemblies such as disk stack 158, voice coil motor (VCM) 142, and head stack assembly (HSA) 120. Disk stack 158 is coupled with base casting 113 by means of motor-hub assembly 140 and disk clamp 143. Motor-hub assembly 140 will have at least one disk 156 coupled with it such that disk 156 can rotate about an axis common to motor-hub assembly 140 and the center of disk 156. Disk 156 has at least one disk surface 130 upon which reside data tracks 135. HSA 120, sometimes referred to as an actuator assembly or carriage, comprises suspension 127, which suspends hard disk drive slider 125 next to disk surface 130, and HSA connector 116. Suspension 127 and hard disk drive slider 125 comprise head gimbal assembly (HGA) 128. Flex cable 110, which is part of HSA 120, conveys data between HSA connector 116 and arm electronics (A/E) module 115. HSA connector 116 also conveys control data between printed circuit board (PCB) 160 and VCM 142.

HSA 120 is coupled pivotally with base casting 113 by means of pivot bearing 145, such that VCM 142 can move HGA 128 with slider 125 arcuately across disk surface 130, accessing data tracks 135. Upon assembly of HSA 120, disk stack 158, VCM 142, and other components with base casting 113, cover 112 is coupled with base casting 113 to enclose these components and sub-assemblies into HDD 100.

Once cover 112 is coupled with base casting 113, PCB 160 is coupled to base casting 113. PCB 160 comprises at least one electrical component 165 which in general performs the electrical tasks of HDD 100, such as status check of HDD 100 before writing data, power control for motor-hub assembly 140, and servo control of VCM 142. VCM 142 is electrically coupled with PCB 160 via HSA connector 116 and an appropriately mating connection 167 on PCB 160. Electrical coupling of HDD 100 to a host system in which HDD 100 operates is enabled in part through PCB connector 163, coupled to PCB 160.

HDD 100 can be used in a variety of operating configurations, such as a single HDD in a computer, and in conjunction with several other HDDs in a rack. Power is supplied to the HDD usually from a single power supply. This power supply may also supply power to other devices in the computing system, such as a fan, an external hard drive, an auxiliary back-up system, and other HDDs in the rack. The power available from the power supply can fluctuate depending upon the power draw of the other devices it supports. For example, adjacent HDDs can be performing different operations with different power demands, such as one drive could be track following while another could be seeking and trying to settle on data, while another is booting up to come on line. The operation of HDDs in a rack can affect mechanically and electrically the operation of a neighboring HDD mounted in the rack.

Power fluctuations from a power supply can cause disturbance in the power driving VCM 142 and affect the positioning accuracy and seek-settle time of HSA 120. Power fluctuations are specified as ripple and assigned a tolerance for AC fluctuations in the DC output of a power supply. The actual fluctuations from a power supply are not known until the power supply is operational. Since PCB connector 163 electrically couples HDD 100 to a power supply to receive power, PCB connector 163 also receives power fluctuations from the power supply. Since PCB connector 163 is coupled with VCM 142 via HSA connector 116 and mating connector 167, power fluctuations from a power supply can affect how VCM 142 moves HGA 128 with slider 125 arcuately across disk surface 130 to access data tracks 135.

The example of an HDD as a mechanism operable to a control and/or servo system that benefits from the embodiments of the present invention most commonly operates with a control system that comprises a servo system with a servo loop. As known by one of ordinary skill in the art, the servo loop of the servo system of an HDD feeds back positional information of slider 125 to a position controller, whereby adjustments can be made to the actual position of slider 125 to meet more closely the requested position of slider 125.

It is appreciated that during the manufacture of HDD 100, a control system is used wherein the servo loop and servo system are not engaged. An example of the manufacturing process of HDD 100 in which a servo loop and servo system are not engaged is during servo write, whereby VCM 142 is controlled by a control system running open loop without the feedback of a servo loop and hence without a servo system. Embodiments of the present invention benefit HDD 100 running open loop with a control system controlling VCM 142 and with HDD 100 running closed loop with a servo system and servo loop controlling VCM 142. Power fluctuations can be detrimental to the motion control of VCM 142 whether VCM 142 is being controlled by a control system or a servo system.

Physical Description

Figure 2:
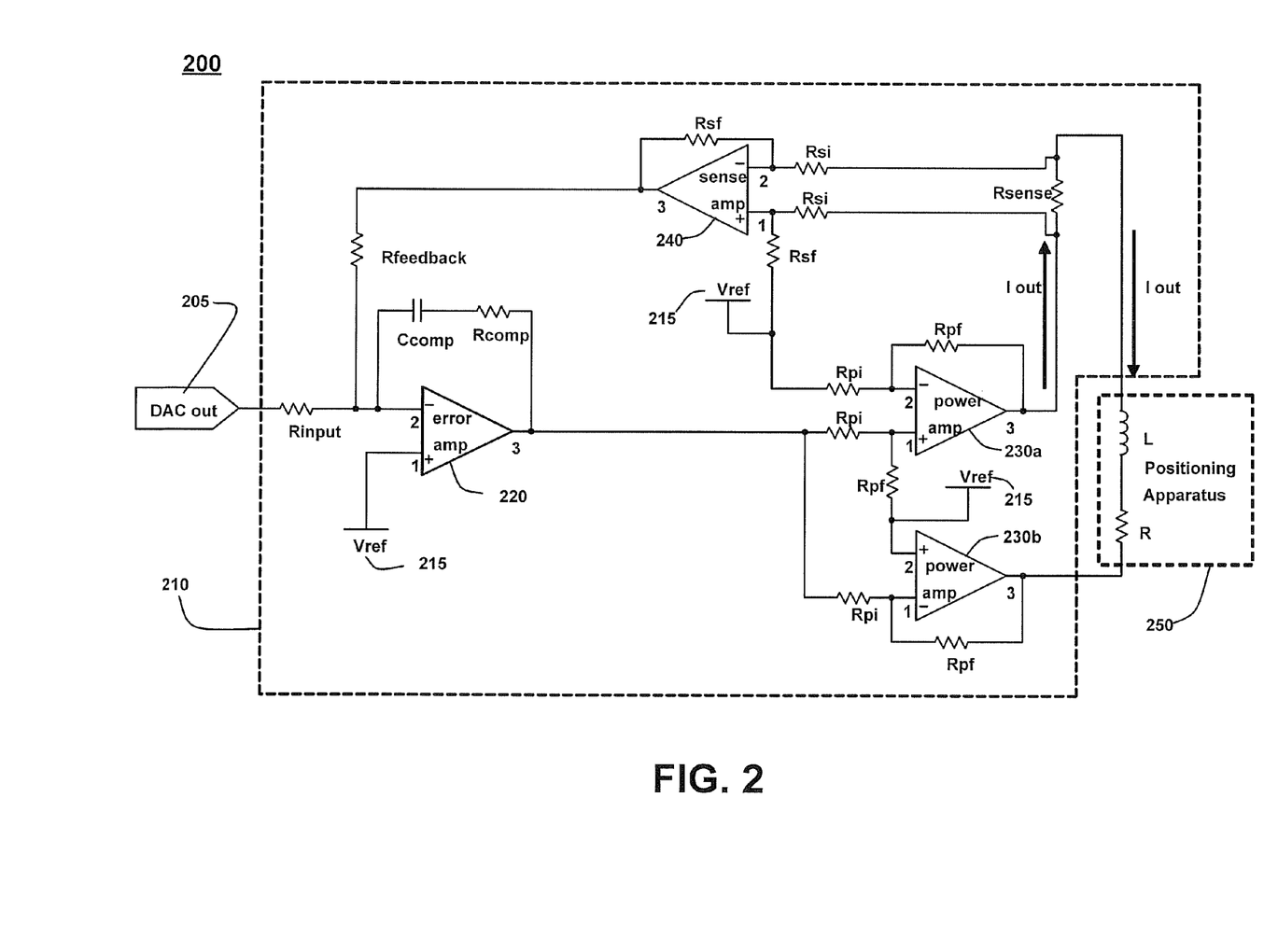
FIG. 2 is a schematic of a transconductance amplifier operable to embodiments of the present invention.

With reference to FIG. 2, schematic 200 of transconductance ($g_m$) amplifier 210 is presented as operable to embodiments of the present invention. Gm amplifier 210 is known and understood in the art for providing a current that is proportional to a voltage that it receives. Gm amplifier 210 is commonly used in control systems for controlling an apparatus such as positioning apparatus 250. An example of positioning apparatus 250 is presented in FIG. 1 as VCM 142 for positioning slider 125 adjacent to data tracks 135. At least one electrical component 165 coupled to PCB 160 comprises $g_m$ amplifier 210.

With continued reference to FIG. 2, digital-to-analog converter output, (DAC out) 205 converts a digital voltage of a control command to an analog voltage of a control command, and presents it to $g_m$ amplifier 210 for processing. Inherent in $g_m$ amplifier 210 is one or more voltage reference Vref 215 which provides at least one reference voltage to error amplifier 220, power amplifier (230a, 230b), and/or current sensing amplifier 240. Vref 215 is typically half of the voltage delivered by the power supply. Since Vref 215 is electrically coupled with the power supply voltage, the performance of error amplifier 220, power amplifier (230a, 230b), and current sensing amplifier 240 is affected by a disturbance in the power supply voltage.

Associated with each amplifier is an array of electrical components. For example, associated with sensing amplifier 240 are sense feedback resistors Rsf, and sense input resistors Rsi. There are similarly associated components for error amplifier 220 and power amplifier (230a, 230b). Each of these components has its own inherent performance or tolerance for its expected electrical parameter. In turn, the tolerance of each electrical component affects the performance of the associated amplifiers, and the performance of $g_m$ amplifier 210. The performance of $g_m$ amplifier 210 has specified tolerances. Today's tolerance of $g_m$ amplifier 210 is insufficient to achieve smaller track pitch goals for recording data tracks 135 and to meet the seek-settle time goals for manipulating data on data tracks 135.

Figure 3:
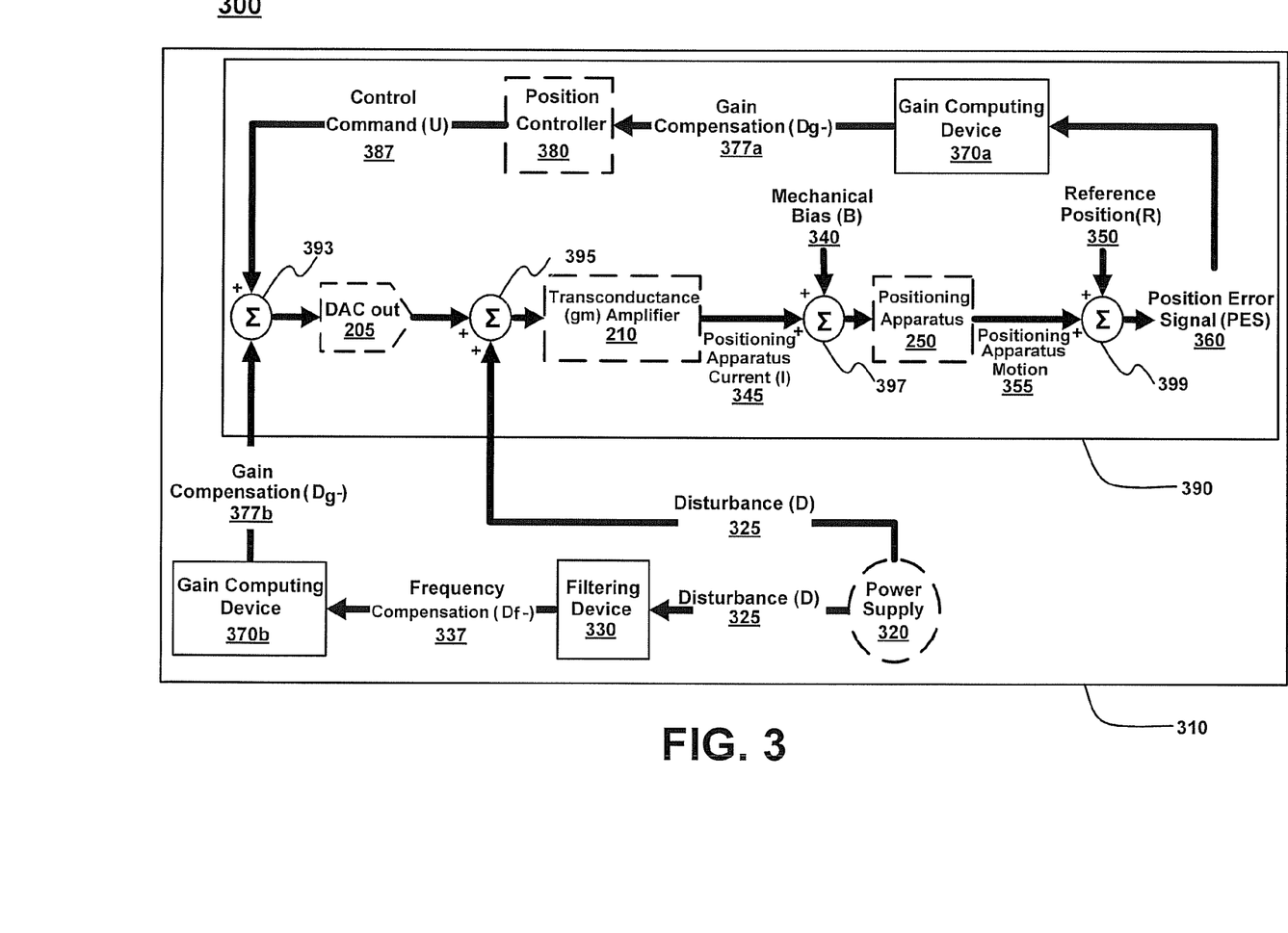
FIG. 3 is a block diagram of a system for compensating for a disturbance in power from a power supply in accordance with one embodiment of the present invention.

With reference to FIG. 3, block diagram 300 of system 310 is presented in accordance with one embodiment of the present invention. System 310 is a system for compensating for disturbance 325 in power from power supply 320. System 310 is coupled with positioning apparatus 250. Without the benefits of the embodiments of the present invention, disturbance 325 would otherwise affect positioning apparatus 250 in an undesirable manner.

Summation node 395 receives both disturbance 325 from power supply 320 and an analog conversion from DAC out 205. Power from power supply 320 comprises disturbance 325 and is transmitted to amplifier 210, such as $g_m$ amplifier 210, via summation node 395. Amplifier 210 amplifies the analog current output commanded from DAC out 205. The analog current output from DAC out 205 is added with disturbance 325 by summation node 395.

In accordance with an embodiment of the present invention, block diagram 300 of system 310 presents amplifier 210 as a transconductance ($g_m$) amplifier. It is appreciated by one of ordinary skill in the art that amplifier 210 is, in accordance with another embodiment of the present invention, a voltage amplifier. It is also appreciated that in the embodiment of amplifier 210 being a voltage amplifier, other elements of system 310 would be changed from current based current-based elements to voltage-based elements, without detracting from the spirit or intent of the embodiments of the present invention. For example, positioning apparatus current 345, which is the output of $g_m$ amplifier 210, would change to positioning apparatus voltage.

In accordance with an embodiment of the present invention, filtering device 330 receives disturbance 325 from power supply 320. Filtering device 330 is a compensation-deriving device that filters the frequency content of disturbance 325 and derives frequency compensation 337 for disturbance 325. In accordance with an embodiment of the present invention, filtering device 330 is a filtering device selected from the group of filtering devices consisting of: an all-pass filter, a lead-lag filter, a notch filter, a band-pass filter, a high-pass filter, a peak filter, and a low-pass filter. Filtering device 330 presents frequency compensation 337 to summation node 393.

In accordance with an embodiment of the present invention, frequency compensation 337, which is derived by filtering device 330, is received by summation node 393. Filtering device 330 is coupled with DAC out 205, which is comprised within servo loop 390 for positioning apparatus 250. In accordance with an embodiment of the present invention, frequency compensation 337 is transmitted to DAC out 205, which is coupled with $g_m$ amplifier 210.

In accordance with another embodiment of the present invention, gain compensation 377b, which is derived by gain computing device 370b, is received by summation node 393. Gain computing device 370b is coupled with DAC out 205, which is comprised within servo loop 390 for positioning apparatus 250.

In accordance with an embodiment of the present invention, positioning apparatus 250 comprises VCM 142 and HSA 120 coupled with HDD 100. Power supply 320 is coupled with HDD 100 and filtering device 330, whereby disturbance 325 from power supply 320 is compensated.

Summation node 397 receives positioning apparatus current 345 from $g_m$ amplifier 210 and also receives mechanical bias 340. Mechanical bias 340 is the result of a variety of mechanical disturbances that affect the position of positioning apparatus 250. Some examples of mechanical bias 340 are: vibration from neighboring HDDs in a rack; spring force from flex cable 110 exerted on HSA 120; wind force from rotating disk stack 158 pushing on HSA 120. This list of examples of mechanical bias 340 is not intended to be an exhaustive and complete list of mechanical biases that can effect the position of HSA 120 and hence slider 125. This list is presented only for the sake of brevity and illustration.

Positioning apparatus 250 moves in accordance with the summation of positioning apparatus current 345 and mechanical bias 340 and results in positioning apparatus motion 355. Summation node 399 receives positioning apparatus motion 355 and reference position 350. Reference position 350 is the desired position of positioning apparatus 250 that is expected to result from positioning apparatus current 345. In accordance with an embodiment of the present invention, summation node 399 compares reference position 350 with positioning apparatus motion 355 and presents position error signal (PES) 360 to gain computing device 370a. In another embodiment of the present invention, gain computing device 370b receives frequency compensation 337 from filter device 330 and derives gain compensation 377b which is transmitted to summation node 393, where it is added with control command 387.

Gain computing device 370a receives PES 360 and derives gain compensation 377a for disturbance 325 from power supply 320. Gain compensation (377a, 377b) comprises amplitude for frequency compensation 337. Gain compensation 377a is transmitted to position controller 380 which issues control command 387. Control command 387 is added with frequency compensation 337 at summation node 393.

Operation

Figure 4:
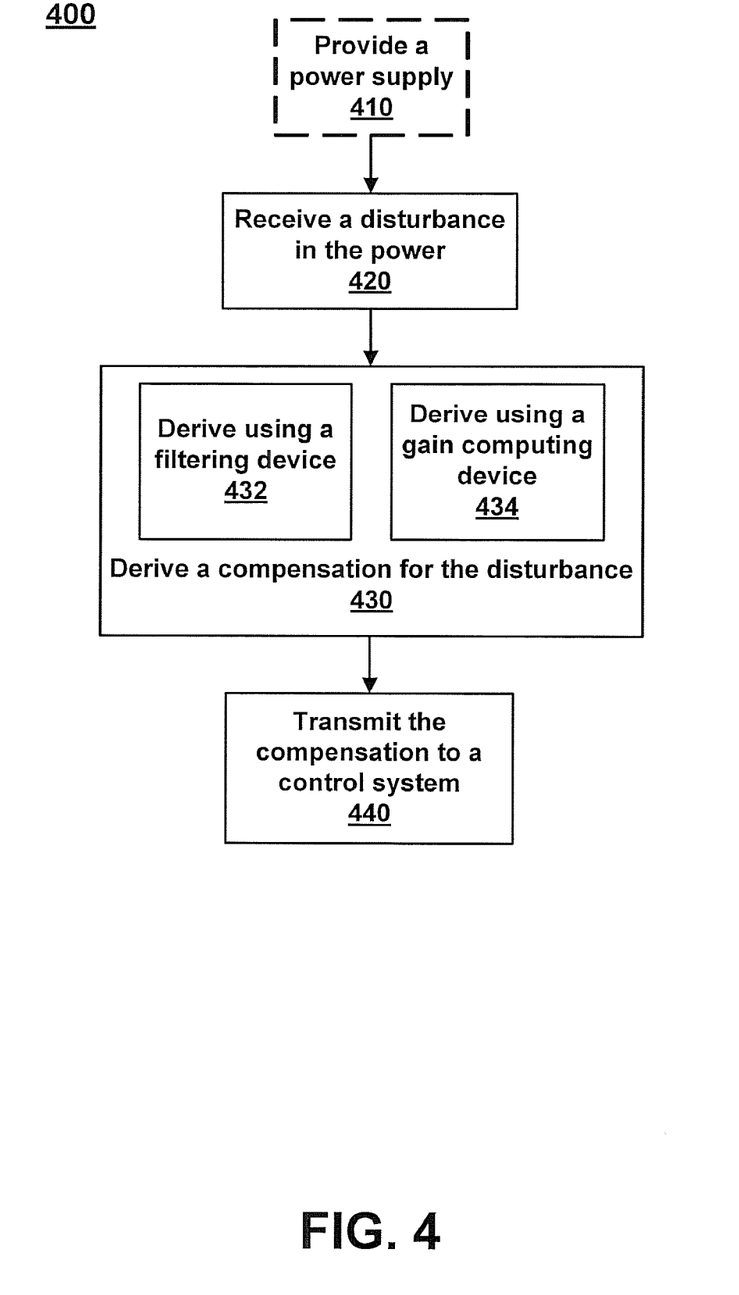
FIG. 4 is a flow chart illustrating a process for compensating for a disturbance in power from a power supply in accordance with one embodiment of the present invention.

FIG. 4 is a flow chart illustrating a process 400 for compensating for a disturbance in power from a power supply in accordance with an embodiment of the present invention. The disturbance without the compensating would otherwise affect a positioning apparatus coupled to the power supply. In accordance with an embodiment of the present invention, process 400 is operable to compensating for a disturbance in power from a power supply coupled with a control system for a positioning apparatus. In accordance with another embodiment of the present invention, process 400 is coupled with a servo system operable to a hard disk drive, whereby the disturbance in power, which can enter the hard disk drive, is compensated thus providing mitigation of an affect of the disturbance in power on the servo loop of the hard disk drive.

A control system operational without a servo loop and a servo system operational with a servo loop both benefit from embodiments of the present invention. Both a control system and a servo system can be adversely affected by a disturbance in power from a power supply and influence the motion of a positioning apparatus which the control system or servo system are operating. Mitigating the effect of a disturbance in power from a power supply can improve the accuracy of movement of the positioning apparatus being operated by either a control system or a servo system.

In one embodiment, processors and electrical components under the control of computer readable and computer executable instructions carry out process 400. The computer readable and computer executable instructions reside, for example, in data storage features such as computer usable volatile and non-volatile memory. However, the computer readable and computer executable instructions may reside in any type of computer readable medium. Although specific components are disclosed in process 400, such components are examples of components for carrying out process 400. That is, the embodiments of the present invention are well suited to performing various other components or variations of the components recited in FIG. 4. Within the present embodiment, it is appreciated that the components of process 400 may be performed by software, by hardware, by an assembly mechanism, through human interaction, or by any combination of software, hardware, assembly mechanism, and human interaction.

Process 400 will be described with reference to elements shown in FIG. 2 and FIG. 3.

As shown at element 410 of process 400, a power supply is provided. If there is not a disturbance or fluctuation in the power from the power supply, the operation of the control system or servo system in which process 400 is to operate is not affected by embodiments of the present invention. Embodiments of the present invention are beneficial during episodes of disturbance in the power from the power supply.

In one embodiment, as shown at element 420 of process 400, a disturbance in the power from the power supply is received. With reference to FIG. 3, summation node 395 receives both disturbance 325 from power supply 320 and an analog conversion from DAC out 205. Power from power supply 320 comprises disturbance 325 and is transmitted to amplifier 210 via summation node 395. Amplifier 210 amplifies the analog current output requested from DAC out 205 which comprises disturbance 325.

In one embodiment, as shown at element 430 of process 400, a compensation for disturbance 325 is derived. Disturbance 325 comprises a frequency component and an amplitude or gain component.

In accordance with another embodiment of the present invention, element 430 of process 400 comprises deriving frequency compensation 337 using a filtering device such as filtering device 330 presented in block diagram 300 of system 310. In accordance with an embodiment of the present invention, a filtering device for deriving frequency compensation is selected from the group of filtering devices consisting of: an all-pass filter, a lead-lag filter, a notch filter, a band-pass filter, a high-pass filter, a peak filter, and a low-pass filter. Deriving frequency compensation using a filter device such as filtering device 330 comprises passing a frequency at approximately 180° out of phase with a disturbance such as disturbance 325. Frequency compensation 337 is a compensation for the frequency content of disturbance 325 in power from power supply 320. Filtering device 330 is coupled with power supply 320.

In accordance with another embodiment of the present invention, element 430 of process 400 comprises deriving gain compensation (377a, 377b) using a gain computing device such as gain computing device (370a, 370b) presented in block diagram 300 of system 310. Gain computing device (370a, 370b) for deriving gain compensation (377a, 377b) comprises a series of element relationships and relational equations which link elements of a servo loop 390, whereby gain compensation (377a, 377b) for power disturbance 325 is derived.

With reference to FIG. 3 and elements of system 310, the relational equations which link elements of a servo loop 390 are expressed with respect to elements of system 310. For the sake of brevity and clarity in expressing the relational equations, the elements in system 310 are defined as follows: PES is position error signal 360; R is reference position 350; Gm is the transconductance gain which translates from voltage input to current output from transconductance amplifier 210; I is positioning apparatus current 345; B is mechanical bias 340; U is control command 387; D is disturbance 325; and V is the input voltage from power supply 320.

Under closed servo loop control, when the DC (direct current) value for PES is equal to zero, the servo loop 390 is tracking and the value of positioning apparatus motion 355 is equal to −R, thus negating reference position R 350, which results in $$PES=0. \tag{1}$$

During tracking, positioning apparatus current 345 is compensating for mechanical bias 340. There is no motion of positioning apparatus 250. Therefore $$I+B=0. \tag{2}$$

The relationship of positional apparatus current 345 to transconductance amplifier output, disturbance 325 and control command 387 is $$I=Gm\times(D+U). \tag{3}$$

Substituting equation (3) into equation (2) presents $$(Gm\times(D+U))+B=0 \tag{4}$$

during tracking on R.

D is a function of the input voltage V from power supply 320. D is also a function of the common mode rejection ratio (CMRR) of the sense amplifier 240 of schematic 200 of FIG. 2. CMRR is proportional to the ratio of a change in disturbance D to a change in input voltage V. CMRR is a metric by which current sense amplifier 240 is characterized for rejecting a common mode voltage. As known by one of ordinary skill in the art, common mode gain of an amplifier enables an amplifier such as current sense amplifier 240 to detect differences between signals with small amplitudes. The common mode gain is specified for any given amplifier, but is only known once it is built and operational. The common mode gain is dependent upon the consistency of matching its components, such as the associated resistors of the sense amplifier 240 presented in schematic 200 of FIG. 2.

With continued reference to FIG. 2, the CMRR of sense amplifier 240 is affected by the consistency of matching the components associated with sense amplifier 240. The CMRR affects how disturbances in the voltage from power supply 320, presented in block diagram 300 of system 310 in FIG. 3 and provided to transconductance ($g_m$) amplifier 210, become manifested in positioning apparatus current 345. Voltage reference (Vref) 215 provides a reference voltage to current sensing amplifier 240 as well as error amplifier 220, power amplifier (230a, 230b). Vref 215 is typically half of the voltage delivered by power supply 320. Since Vref 215 is electrically coupled with power supply voltage V, the performance of current sensing amplifier 240, as well as error amplifier 220, and power amplifier (230a, 230b), is affected by disturbance 325 in V.

The series of element relationships and relational equations which comprise gain computing device (370a, 370b) continue as follows: A first power setting V1 for power supply 320 is presented to system 310. A disturbance D1 is caused by V1 interacting with current sensing amplifier 240 coupled with $g_m$ amplifier 210. Disturbance D1 is associated with the effect of V1 on CMRR associated with current sensing amplifier 240. This is associated with CMRR because the mechanics of positioning apparatus 250 is constant, therefore mechanical bias 340 has not changed, and servo loop 390 is tracking a constant reference position 350. The control command, U1 for the V1 power setting is measured.

A second power setting V2 for power supply 320 is presented to system 310. A disturbance D2 is caused by V2 interacting with current sensing amplifier 240 coupled with $g_m$ amplifier 210. Disturbance D2 is associated with the effect of V2 on CMRR associated with current sensing amplifier 240 for the same aforementioned reasons, i.e. constant mechanical bias 340 and constant reference position 350. The control command, U2 for the V2 power setting is measured. Recalling equation (4)

$$(Gm \times (D+U)) + B = 0, \quad (4)$$

D can be expressed as $$D = (-B/Gm) - U. \quad (5)$$

The disturbance D is whatever bias B that is needed mechanically to stay at reference position R transformed back through the transconductance amplifier to match the control command current, but in the opposite sign. The CMRR is proportional to the differences between the two disturbances (D1−D2) and the differences in voltage (V1−V2) in the power supply. It is appreciated that from a control system standpoint that the position controller 380 for the above set of conditions provides a signal that matches the disturbance D. Mathematically it is possible to state that $$CMRR \propto \frac{(D1-D2)}{(V1-V2)} \rightarrow \frac{(U2-U1)}{(V1-V2)}. \quad (6)$$

The proportionality constant for CMRR, which is part of the previously described gain computing device, enables optimal gain compensation (377a, 377b) to be derived. The amplitude for disturbance 325 from power supply 320 is derived and hence is used to compute gain compensation (377a, 377b). In another embodiment of the present invention, CMRR can also be used to influence frequency compensation 337 through an appropriate design and selection of filtering device 330.

With continued reference to FIG. 4, and in accordance with another embodiment of the present invention, element 430 of process 400 comprises element 432 for deriving a compensation using a filtering device, such as filtering device 330, and element 434 for deriving a compensation using a gain computing device, such as gain computing device (370a, 370b).

In one embodiment, as shown at element 440 of process 400, frequency compensation 337 and/or gain compensation (377a, 377b) are coupled with a control system for a positioning apparatus. In accordance with an embodiment of the present invention, frequency compensation 337 and/or gain compensation (377a, 377b) are feeding forward to a servo system such as system 310 presented in block diagram 300 of FIG. 3. In accordance with another embodiment of the present invention, frequency compensation 337 and/or gain compensation (377a, 377b) are transmitted to a digital-to-analog converter, such as DAC out 205 as presented in schematic 200 of FIG. 2 and block diagram 300 of FIG. 3, wherein DAC out 205 is coupled with an amplifier, such as $g_m$ amplifier 210 as presented in schematic 200 of FIG. 2 and block diagram 300 of FIG. 3.

In accordance with another embodiment of the present invention, transmitting frequency compensation 337 and/or gain compensation (377a, 377b) comprises transmitting to a servo system operable to a hard disk drive, whereby disturbance 325 in power, which can enter a hard disk drive such as HDD 100 presented in FIG. 1, is compensated thus providing mitigation of an affect of disturbance 325 in power on a servo loop, such as servo loop 390 as presented in block diagram 300 of FIG. 3, of the hard disk drive.

The present invention, in the various presented embodiments, provides compensation for a disturbance in power from a power supply, wherein the disturbance without the compensation would otherwise affect a positioning apparatus coupled with the power supply. Embodiments of the present invention provide an efficient and economical means for compensating for a disturbance in power from a power supply. Present methods for mitigating a disturbance in power from a power supply require sorting of chips based on CMRR performance. This is expensive for the chip manufacturer who passes this cost onto the HDD manufacturer. Another possible option for mitigating a disturbance in power from a power supply requires advances in chip manufacturing wherein better matching of resistors and other components in a transconductance amplifier is developed. Another possible option for mitigating a disturbance in power from a power supply requires development of the capability to adjust the resistance of the resistors so that a desired CMRR can be achieved.

Another possible option for mitigating a disturbance in power from a power supply is to reallocate the disturbance budget, giving the electrical disturbance more latitude and tightening the mechanical disturbance budget. This is possible at the cost and expenses of damping components inside the HDD as well as the HDD itself, or over designing the components inside the HDD that exert a mechanical bias or disturbance on the servo system. Over design is a costly approach.

An example of a benefit enabled by embodiments of the present invention, in the context of HDD customer qualification testing, includes more favorable test results by preventing the susceptibility of the HDD to disturbances in power from a power supply. Customers who understand disturbances would be more likely to accept HDDs that benefit from embodiments of the present invention.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for compensating for a disturbance in power from a power supply, wherein said disturbance without said compensating would otherwise affect a positioning apparatus coupled with said power supply, said method comprising:

receiving said disturbance in power from said power supply;

deriving a compensation for said disturbance in said power; and transmitting said compensation to a control system for said positioning apparatus.

2. The method as recited in claim 1, wherein said deriving said compensation for said disturbance in said power comprising:

deriving said compensation using a filtering device coupled with said power supply.

3. The method as recited in claim 1, wherein said deriving said compensation for said disturbance in said power further comprising:

deriving said compensation using a gain computing device, whereby an amplitude of said disturbance in said power is derived.

4. The method as recited in claim 1, wherein said deriving said compensation for said disturbance in said power further comprising:
deriving said compensation using a filtering device and a gain computing device.

5. The method as recited in claim 1, wherein said transmitting said compensation to said control system for said positioning apparatus comprising:
adding said compensation with a control command.

6. The method as recited in claim 5 further comprising:
transmitting said compensation to a digital-to-analog converter, wherein said digital-to-analog converter is coupled with an amplifier.

7. The method as recited in claim 1, wherein said transmitting said compensation with said control system comprising:
feeding forward said compensation to a servo system.

8. The method as recited in claim 7, wherein said transmitting to said servo system comprising:
transmitting to a servo system operable to a hard disk drive, whereby said disturbance in power, which can enter said hard disk drive, is compensated thus providing mitigation of an effect of said disturbance in power on said servo loop of said hard disk drive.

9. A system for compensating for a disturbance in power from a power supply coupled with a positioning apparatus, wherein said disturbance without said compensating would otherwise affect said positioning apparatus, said system comprising:
a summation node for receiving said disturbance in power from a power supply;
at least one compensation deriving device for deriving at least one compensation for said disturbance in power from said power supply; and
a coupler for coupling said compensation deriving device with a servo loop for said positioning apparatus.

10. The system of claim 9, wherein said positioning apparatus comprises a voice coil motor and head stack assembly coupled with a hard disk drive.

11. The system of claim 9, wherein said summation node for receiving said disturbance in power from said power supply is coupled with an amplifier, wherein said disturbance in power from said power supply is amplified.

12. The system of claim 11 wherein said amplifier comprises a transconductance amplifier.

13. The system of claim 11 wherein said amplifier comprises a voltage amplifier.

14. The system of claim 9, wherein said compensation deriving device comprises a filtering device.

15. The system of claim 9, wherein said coupler for coupling said compensation deriving device with said servo loop for said positioning apparatus comprises a digital-to-analog converter.

16. The system of claim 9, wherein said filtering device is selected from the group of filtering devices consisting of: an all-pass filter, a lead-lag filter, a notch filter, a band-pass filter, a high-pass filter, a peak filter, and a low-pass filter.

17. The system of claim 9, wherein said power supply is coupled with a hard disk drive, whereby said disturbance in power from said power supply in said hard disk drive is compensated.

18. A computer-readable memory containing executable instructions, wherein said instructions when executed effect a method for compensating for a disturbance in power from a power supply, wherein said disturbance without said compensating would otherwise affect a positioning apparatus coupled with said power supply, said method comprising:
receiving said disturbance in power from said power supply;
deriving a compensation for said disturbance in said power; and
transmitting said compensation to a control system for said positioning apparatus.

19. The computer-readable memory as described in claim 18, wherein said deriving said compensation for said disturbance in said power comprising:
deriving said compensation using a filtering device coupled with said power supply.

20. The computer-readable memory as described in claim 18, wherein said deriving said compensation for said disturbance in said power further comprising:
deriving said compensation using a gain computing device, whereby an amplitude of said disturbance in said power is derived.

21. The computer-readable memory as described in claim 18, wherein said deriving said compensation for said disturbance in said power further comprising:
deriving said compensation using a filtering device and a gain computing device.

22. The computer-readable memory as described in claim 18, wherein said transmitting said compensation to said control system for said positioning apparatus comprising:
adding said compensation with a control command.

23. The computer-readable memory as described in claim 22 further comprising:
transmitting said compensation to a digital-to-analog converter, wherein said digital-to-analog converter is coupled with an amplifier.

24. The computer-readable memory as described in claim 18, wherein said transmitting said compensation with said control system comprising:
feeding forward said compensation to a servo system.

25. The computer-readable memory as described in claim 23 wherein said transmitting to said servo system comprising:
coupling with a servo system operable to a hard disk drive, whereby said disturbance in power, which can enter said hard disk drive, is compensated thus providing mitigation of an effect of said disturbance in power on said servo loop of said hard disk drive.

* * * * *